United States Patent
Ahn et al.

(10) Patent No.: US 12,397,645 B2
(45) Date of Patent: Aug. 26, 2025

(54) ACCESSIBLE DISPLAY

(71) Applicant: GM Global Technology Operations LLC, Detroit, MI (US)

(72) Inventors: Ki Hyun Ahn, Lake Orion, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 18/468,963

(22) Filed: Sep. 18, 2023

(65) Prior Publication Data

US 2025/0091437 A1   Mar. 20, 2025

(51) Int. Cl.

| | |
|---|---|
| *B60K 35/00* | (2024.01) |
| *B60K 35/22* | (2024.01) |
| *B60K 35/28* | (2024.01) |
| *B60K 35/53* | (2024.01) |
| *B60K 35/65* | (2024.01) |
| *B60R 16/037* | (2006.01) |
| *G06V 20/59* | (2022.01) |

(52) U.S. Cl.
CPC ............ *B60K 35/00* (2013.01); *B60R 16/037* (2013.01); *G06V 20/59* (2022.01); *B60K 35/22* (2024.01); *B60K 35/28* (2024.01); *B60K 35/53* (2024.01); *B60K 35/65* (2024.01); *B60K 2360/164* (2024.01); *B60K 2360/21* (2024.01)

(58) Field of Classification Search
CPC .... B60K 35/00; B60K 2360/21; B60K 35/65; B60K 35/28; B60K 35/53; B60K 2360/164; B60K 35/22; G06V 20/59; B60R 16/037
See application file for complete search history.

(56) References Cited

U.S. PATENT DOCUMENTS

2022/0075191 A1   3/2022   Rittger et al.

FOREIGN PATENT DOCUMENTS

| | | | |
|---|---|---|---|
| DE | 102020206320 A1 | 11/2021 | |
| WO | WO-2015168464 A1 * | 11/2015 | ............. B60K 35/22 |

\* cited by examiner

*Primary Examiner* — Michael D Lang
(74) *Attorney, Agent, or Firm* — Vivacqua Crane, PLLC (57) ABSTRACT

A system for automatically positioning a display relative to an occupant within a vehicle includes a system controller adapted to identify user preferences for a position of the display, an occupant monitoring system adapted to monitor the occupant, a microphone adapted to receive verbal input from the occupant, the system controller further adapted to determine that the occupant is one of reaching toward the display, or viewing the display, and automatically move the display to a first position that is optimal for facilitating physical interaction, by the occupant, with the display when the system controller determines that the occupant is reaching toward the display, and automatically move the display to a second position that is optimal for allowing the occupant to view the display when the system controller determines that the occupant is viewing the display.

20 Claims, 5 Drawing Sheets

ACCESSIBLE DISPLAY

INTRODUCTION

The present disclosure relates to a system and method for automatically positioning a display relative to an occupant within a vehicle.

Vehicles are equipped with displays that provide information to occupants within the vehicle and allow the occupants within the vehicle to input information, such as with a touch-screen display. Fixed location displays do not provide optimal interaction by an occupant because if the display is being viewed, an optimal location of the display would be higher and further away from the occupant, but if the occupant is interacting with the display by reaching forward to touch the display, an optimal location of the display would be lower and closer to the occupant.

Thus, while current systems and methods achieve their intended purpose, there is a need for a new and improved system and method for automatically positioning a display relative to an occupant within a vehicle.

SUMMARY

According to several aspects of the present disclosure, a method of automatically positioning a display relative to an occupant interacting with the display within a vehicle includes identifying, with a system controller, user preferences for a position of the display relative to the occupant within the vehicle, monitoring, with an occupant monitoring system within the vehicle and in communication with the system controller, the occupant's posture, hand position, hand movements, head movements and eye gaze, receiving, with the system controller, via a microphone in communication with the system controller, verbal input from the occupant, determining, with the system controller, based on data received from the occupant monitoring system and the microphone, that the occupant is one of reaching toward the display or viewing the display, when the system controller determines that the occupant is reaching toward the display, automatically moving the display to a first position that is optimal for facilitating physical interaction, by the occupant, with the display, and when the system controller determines that the occupant is viewing the display, automatically moving the display to a second position that is optimal for allowing the occupant to view the display.

According to another aspect, the identifying, with a system controller, user preferences for a position of the display relative to the occupant within the vehicle further includes at least one of receiving, with the system controller, real time input from the occupant, and accessing, with the system controller, a machine learning model of preferences of the occupant based on past interactions.

According to another aspect, the method further includes identifying, with the system controller, based on data received from the occupant monitoring system, a seating position of the occupant within the vehicle, and automatically rotating and tilting the display to an optimal orientation for interaction by the occupant.

According to another aspect, the automatically rotating and tilting the display to an optimal orientation for interaction by the occupant further includes accessing, with the system controller, a machine learning model of preferences of the occupant based on past interactions.

According to another aspect, the automatically moving the display to a first position that is optimal for facilitating physical interaction, by the occupant, with the display further includes automatically moving the display, via a motorized carriage that is in communication with the system controller and onto which the display is mounted, along a track within which the motorized carriage is supported, to the first position that is optimal for facilitating physical interaction, by the occupant, with the display, the automatically moving the display to a second position that is optimal for allowing the occupant to view the display further includes automatically moving the display, via the motorized carriage, along the track, to the second position that is optimal for allowing the occupant to view the display, and the automatically rotating and tilting the display to an optimal orientation for interaction by the occupant further includes automatically rotating and tilting the display, via a motorized articulating mount that is in communication with the system controller and supports the display onto the motorized carriage, to an optimal orientation for interaction by the occupant.

According to another aspect, the automatically moving the display to a first position that is optimal for facilitating physical interaction, by the occupant, with the display further includes automatically moving the display, via a mechanized articulating arm that is in communication with the system controller and onto which the display is mounted, to the first position that is optimal for facilitating physical interaction, by the occupant, with the display, the automatically moving the display to a second position that is optimal for allowing the occupant to view the display further includes automatically moving the display, via the mechanized articulating arm onto which the display is mounted, to the second position that is optimal for allowing the occupant to view the display, and the automatically rotating and tilting the display to an optimal orientation for interaction by the occupant further includes automatically rotating and tilting the display, via the mechanized articulating arm onto which the display is mounted, to an optimal orientation for interaction by the occupant.

According to another aspect, the method further includes receiving, with the system controller, real-time preferences from the occupant related to a desired position and orientation of the display, moving the display, with the system controller, to the desired position, and rotating and tilting the display, with the system controller, to the desired orientation.

According to another aspect, the method includes receiving, with the system controller, input from the occupant selecting an application, accessing, with the system controller, the machine learning model of preferences of the occupant based on past interactions when the occupant used the selected application, automatically moving the display, with the system controller, to an appropriate position for the occupant to interact with the selected application, and automatically rotating and tilting the display, with the system controller, to an appropriate orientation for the occupant to interact with the selected application.

According to another aspect, the method includes determining, with the system controller, that a specific application is required based on current vehicle conditions, activating, with the system controller, the specific application, accessing, with the system controller, the machine learning model of preferences of the occupant based on past interactions when the occupant used the specific application, automatically moving the display, with the system controller, to an appropriate position for the occupant to interact with the specific application, and automatically rotating and tilting the display, with the system controller, to an appropriate orientation for the occupant to interact with the specific application.

According to another aspect, the method further includes receiving, with the system controller, data from a plurality of sensors within the vehicle and the occupant monitoring system, and automatically adjusting a location and orientation of the display based on vehicle configuration, occupant features and vehicle environmental conditions.

According to another aspect, the method includes updating the machine learning model in light of adjustments made to the location and orientation of the display based on vehicle configuration, occupant features and vehicle environmental conditions.

According to another aspect, the method includes updating, with the system controller, the machine learning model of preferences of the occupant when the system controller receives, from the occupant, real-time preferences for the position and orientation of the display.

According to several aspects of the present disclosure, a system for automatically positioning a display relative to an occupant interacting with the display within a vehicle includes a system controller adapted to identify user preferences for a position of the display relative to the occupant within the vehicle, an occupant monitoring system in communication with the system controller and adapted to monitor the occupant's posture, hand position, hand movements, head movements and eye gaze, a microphone in communication with the system controller and adapted to receive verbal input from the occupant, the system controller further adapted to determine, based on data received from the occupant monitoring system and the microphone, that the occupant is one of reaching toward the display or viewing the display, and automatically move the display to a first position that is optimal for facilitating physical interaction, by the occupant, with the display when the system controller determines that the occupant is reaching toward the display, automatically move the display to a second position that is optimal for allowing the occupant to view the display when the system controller determines that the occupant is viewing the display, identify, based on data received from the occupant monitoring system, a seating position of the occupant within the vehicle, and automatically rotate and tilt the display to an optimal orientation for interaction by the occupant.

According to another aspect, the system controller is further adapted to automatically move the display, via a motorized carriage that is in communication with the system controller and onto which the display is mounted, along a track within which the motorized carriage is supported, to the first position that is optimal for facilitating physical interaction, by the occupant, with the display when the system controller determines that the occupant is reaching toward the display, automatically move the display, via the motorized carriage, along the track, to the second position that is optimal for allowing the occupant to view the display when the system controller determines that the occupant is viewing the display, and automatically rotate and tilt the display, via a motorized articulating mount that is in communication with the system controller and supports the display onto the motorized carriage, to the optimal orientation for interaction by the occupant.

According to another aspect, the system controller is further adapted to automatically move the display, via a mechanized articulating arm that is in communication with the system controller and onto which the display is mounted, to the first position that is optimal for facilitating physical interaction, by the occupant, with the display when the system controller determines that the occupant is reaching toward the display, automatically move the display, via the mechanized articulating arm, to the second position that is optimal for allowing the occupant to view the display when the system controller determines that the occupant is viewing the display, and automatically rotate and tilt the display, via the mechanized articulating arm, to the optimal orientation for interaction by the occupant.

According to another aspect, when identifying user preferences for a position of the display relative to the occupant within the vehicle and when rotating and tilting the display to an optimal orientation for interaction by the occupant the system controller is further adapted to at least one of receive real time input from the occupant and access a machine learning model of preferences of the occupant based on past interactions, and when the system controller receives real-time preferences from the occupant related to a desired position and orientation of the display, the system controller is further adapted to move the display to the desired position, rotate the display to the desired orientation, and update the machine learning model of preferences of the occupant for the position and orientation of the display.

According to another aspect, the system controller is further adapted to receive input from the occupant selecting an application, access the machine learning model of preferences of the occupant based on past interactions when the occupant used the selected application, automatically move the display to an appropriate position for the occupant to interact with the selected application, and automatically rotate and tilt the display to an appropriate orientation for the occupant to interact with the selected application.

According to another aspect, the system controller is further adapted to determine that a specific application is required based on current vehicle conditions, activate the specific application, access the machine learning model of preferences of the occupant based on past interactions when the occupant used the specific application, automatically move the display to an appropriate position for the occupant to interact with the specific application, and automatically rotate and tilt the display to an appropriate orientation for the occupant to interact with the specific application.

According to another aspect, the system controller is further adapted to receive, from a plurality of sensors within the vehicle and the occupant monitoring system, data related to vehicle configuration, occupant features and vehicle environmental conditions, automatically adjust a location and orientation of the display based on vehicle configuration, occupant features and vehicle environmental conditions, and update the machine learning model in light of adjustments made to the location and orientation of the display based on vehicle configuration, occupant features and vehicle environmental conditions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
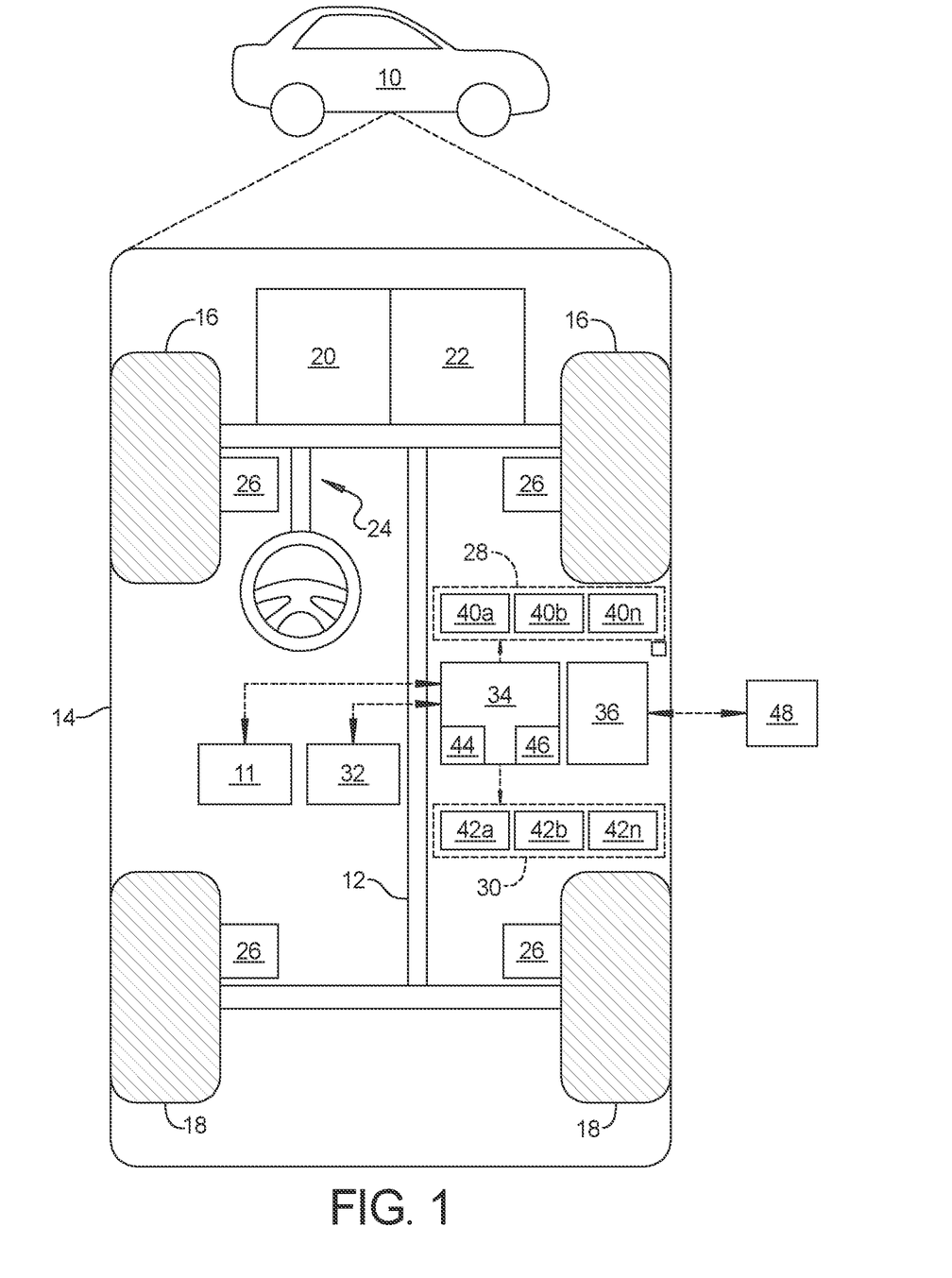
FIG. 1 is a schematic diagram of a vehicle having a system for automatically positioning a display relative to an occupant interacting with the display within a vehicle according to an exemplary embodiment.

In accordance with an exemplary embodiment, FIG. 1 shows a vehicle 10 with an associated system 11 for automatically positioning a display relative to an occupant 56 within a vehicle 10 in accordance with various embodiments. In general, the system 11 works in conjunction with other systems within the vehicle 10 to display various information and infotainment content for the occupant. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
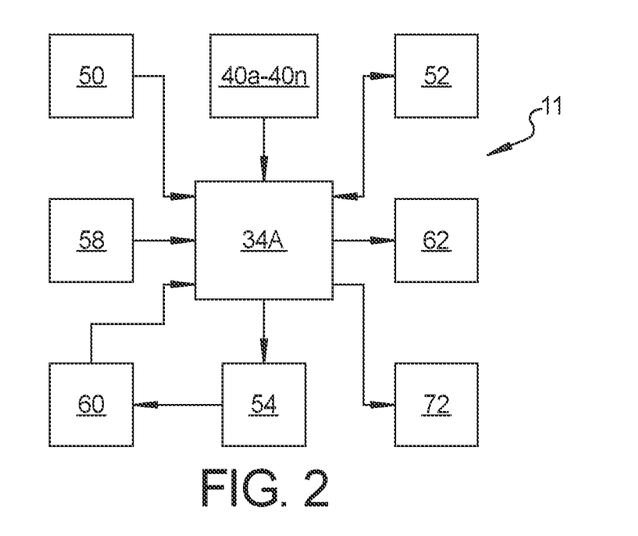
FIG. 2 is a schematic diagram of the system according to an exemplary embodiment.

Referring to FIG. 2 a schematic diagram of the system 11 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with an occupant monitoring system 50 that is adapted to monitor the occupant's 56 posture, hand position, hand movements, head movements and eye gaze. The system 11 further includes a display 52 in communication with the system controller 34A and adapted to be viewed by the occupant 56 within the vehicle 10, a database 54 in communication with the system controller 34A, a microphone 58 in communication with the system controller 34A and adapted to receive verbal input from the occupant 56, and a machine learning model 60 in communication with the system controller 34A and the database 54.

In an exemplary embodiment, the display 52 is a touch screen display of a human machine interface (HMI) that is adapted to display information for the occupant 56 and to allow the occupant 56 to interact with the system controller 34A and input information to the system controller 34A by touching the display 52.

Figure 3A:
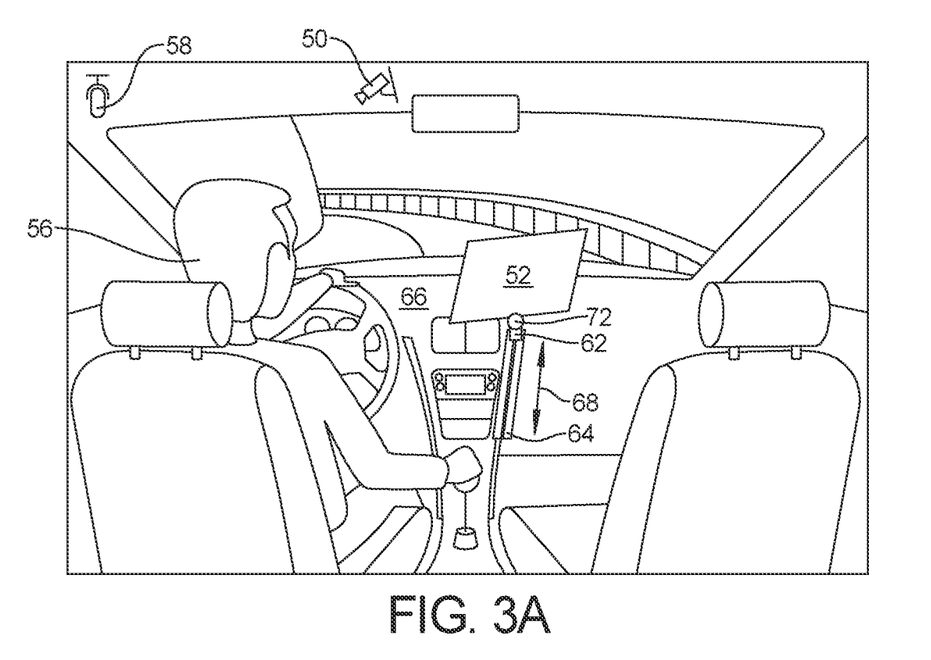
FIG. 3A is a schematic diagram of an interior of the vehicle with an occupant seated therein wherein the occupant is viewing the display and the display is at a second position.
Figure 3B:
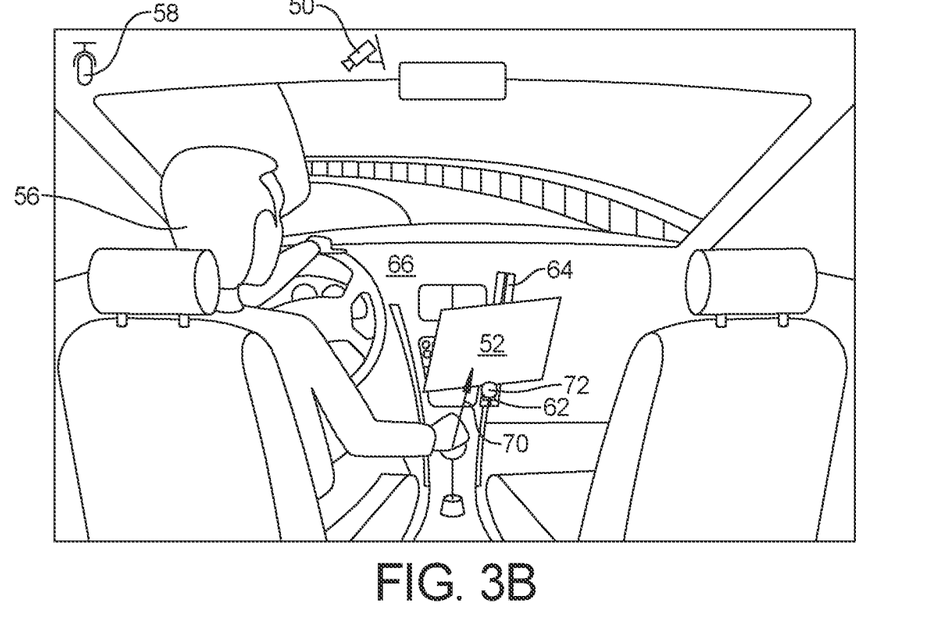
FIG. 3B is a schematic diagram of an interior of the vehicle with an occupant seated therein wherein the occupant is reaching toward the display and the display is at a first position.

Referring to FIG. 3A and FIG. 3B, in an exemplary embodiment, the display 52 is mounted onto a motorized carriage 62 that is moveably supported within a track 64 that is mounted within the vehicle 10, such as, by way of non-limiting example, to a dashboard 66. The track 64 could be supported onto a structure extending upward from the floor of the vehicle 10, a structure extending downward from the roof of the vehicle 10, or a structure extending from any other portion of the interior of the vehicle 10, such as the center console. The motorized carriage 62 is in communication with the system controller 34A. Based on instructions received from the system controller 34A, the motorized carriage 62 moves the display 52 back and forth within the track 64, as indicated by arrow 68. The motorized carriage 62 may comprise a rotary motor and a ball screw, a linear actuator, a linear motor, or any other known mechanism suitable for moving the motorized carriage 62 back and forth within the track 64.

The system controller is adapted to identify user preferences for a position of the display 52 relative to the occupant 56 within the vehicle 10, and to determine, based on data received from the occupant monitoring system 50 and the microphone 58, that the occupant 56 is either reaching toward the display 52, or only viewing the display 52.

If the system controller 34A determines that the occupant 56 is only viewing the display 52, the system controller 34A automatically, via the motorized carriage 62, moves the display along the track to a second position that is optimal for allowing the occupant 56 to view the display 52. As shown in FIG. 3A, the system controller 34A positions the display 52 at a higher location that is further away from the occupant 56, which is optimal for allowing the occupant to view the display 52. If the display 52 is already at the second position, the system controller 34A does nothing, and keeps the display 52 at the second position.

If the system controller 34A determines that the occupant 56 is reaching for the display 52, as indicated by arrow 70 in FIG. 3B, the system controller 34A automatically, via the motorized carriage 62, moves the display 52 along the track 64 to a first position that is optimal for facilitating physical interaction, by the occupant 56, with the display 52. As shown in FIG. 3B, the system controller 34A positions the display 52 at a lower location that is closer to the occupant 56, which is optimal for allowing the occupant 52 to reach out and touch the display 52. If the display 52 is already at the first position, the system controller 34A does nothing, and keeps the display 52 at the second position.

Figure 4A:
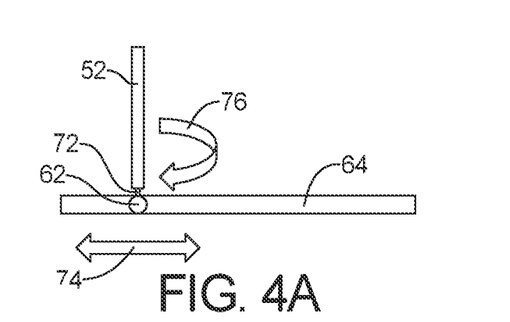
FIG. 4A is a schematic diagram illustrating how the display moves linearly along a track and rotates.
Figure 4B:
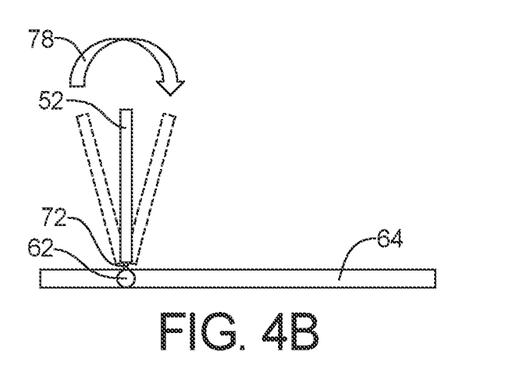
FIG. 4B is a schematic diagram illustrating how the display tilts.

In an exemplary embodiment, the system controller 34A is further adapted to identify, based on data received from the occupant monitoring system 50, a seating position of the occupant 56 within the vehicle 10, and automatically rotate and tilt the display 52, via a motorized articulating mount 72 that is in communication with the system controller 34A and supports the display 52 onto the motorized carriage 62, to an optimal orientation for interaction by the occupant 56. Referring to FIG. 4A, the motorized carriage 62 moves the display back and forth along the track 64, as indicated by arrow 74, and the motorized articulating mount 72 can rotate the display 52 left and right about a vertical axis, as indicated by arrow 76. Additionally, referring to FIG. 4B, the motorized articulating mount 72 can tilt the display 52 as indicated by arrow 78, to accommodate for the height of the occupant 56 and to alleviate sun glare on the display 52.

Figure 5A:
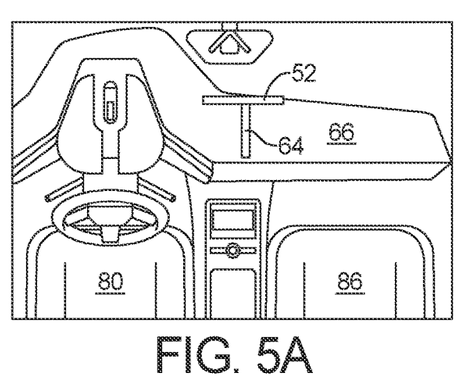
FIG. 5A is a schematic diagram of an interior of the vehicle wherein the display is positioned at the second position.
Figure 5B:
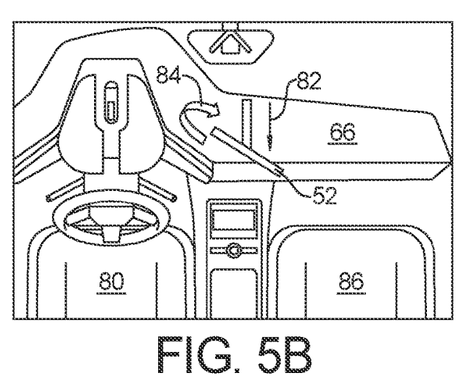
FIG. 5B is a schematic diagram of the interior of the vehicle wherein the display moves downward toward the occupant to the first position and rotates toward a driver seat.
Figure 5C:
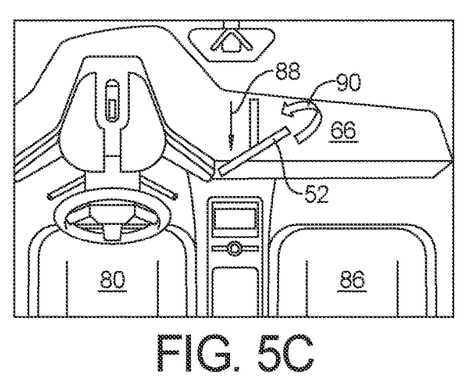
FIG. 5C is a schematic diagram of the interior of the vehicle wherein the display moves downward toward the occupant to the first position and rotates toward a passenger seat.

For example, referring to FIG. 5A, the display 52 is shown located at an upper most end of the track 64, furthest away from any occupants 56 within the vehicle 10. If the system controller 34A determines that an occupant 56 seated in the driver's seat 80 is reaching out to interact with the display 52, then, referring to FIG. 5B, the system controller 34A moves the display 52, via the motorized carriage 62 along the track to the first position that is lower within the vehicle 10 and closer to the occupant 56, as indicated by arrow 82, and rotates the display 52, via the motorized articulating mount 72 such that the display 52 is facing toward the driver's seat 80, as indicated by arrow 84. Depending on the height of the occupant 56 in the driver's seat 80 the system controller 34A may also tilt the display 52 accordingly. Similarly, if the system controller 34A determines that an occupant 56 seated in the passenger seat 86 is reaching out to interact with the display 52, then, referring to FIG. 5C, the system controller 34A moves the display 52, via the motorized carriage 62 along the track to the first position that is lower within the vehicle 10 and closer to the occupant 56, as indicated by arrow 88, and rotates the display 52, via the motorized articulating mount 72 such that the display 52 is facing toward the passenger seat 86, as indicated by arrow 90. Depending on the height of the occupant 56 in the passenger seat 80 the system controller 34A may also tilt the display 52 accordingly.

Figure 6:
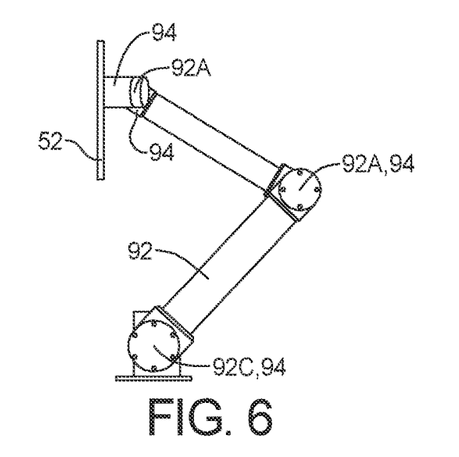
FIG. 6 is a perspective view of an exemplary embodiment incorporating a mechanized articulating arm onto which the display is mounted.

In another exemplary embodiment, the display 52 is supported on a mechanized articulating arm 92. Referring to FIG. 6, one example of a mechanized articulating arm 92 includes three parts: a wrist 92A, an elbow 92B, and a shoulder 92C, which include joints to allow flexibility for the mechanized articulating arm 92 to move freely in any direction. The mechanized articulating arm 92 can move forward, backward, up, and down, it can rotate and spin. The joints at each of the wrist 92A, the elbow 92B and the shoulder 92C act as axes that enable a degree of movement. The mechanized articulating arm 92 can includes three joints, four joints, or six joints. It should be understood that the mechanized articulating arm 92 could have any suitable number of joints. Step motors, in communication with the system controller 34A, and located at the joints move the wrist 92A, the elbow 92B and the shoulder 92C in precise increments, which allows the mechanized articulating arm 92 to move the display 52 in a very precise manner repeatedly with a high level of accuracy and reliability to adjust the position and orientation of the display 52 for the occupant 56. A base 94 of the mechanized articulating arm 92 may be mounted onto any suitable structure within the vehicle 10, such as the dashboard 66, a center console, the roof or the floor of the vehicle 10.

In an exemplary embodiment, when identifying user preferences for a position of the display 52 relative to the occupant 56 within the vehicle 10 and when rotating and tilting the display 52 to an optimal orientation for interaction by the occupant 56 the system controller 34A is further adapted to at least one of 1) receive real time input from the occupant 56, and 2) access the machine learning model 60 to obtain preferences of the occupant 56 based on past interactions.

The system controller 34A, via communication with the plurality of onboard sensors 40a-40n is adapted to collect real-time data related to preferences of the location and orientation of the display 52 for the occupant, as well as a location of the vehicle 10 and operating conditions of the vehicle 10, such as weather, time of day, etc. The database 54 is in communication with the system controller 34A and is adapted to store data related to past preferences and operating conditions of the vehicle 10 when such past preferences were recorded.

The system controller 34A, using the machine learning model 60, predicts the first and second optimal positions based on 1) identifying the occupant, 2) current vehicle operating conditions, 3) real-time current input from the occupant of preferences for the location an orientation of the display 52, and accessing the database 54 and the machine learning model 60. If real-time current input is received from the occupant 56, this will over-ride any predictions made by the system controller 34A, however, in the absence of real-time current input from the occupant 56, the system controller 34A will use the machine learning model 60 for the occupant 56 and current vehicle operating conditions to predict an optimal location and orientation for the display 52. Various techniques are employed to extract meaningful features from sensor readings and data, including time-series analysis, frequency-domain analysis, and spatial-temporal patterns. The machine learning model 60 may be one of, but not limited to, Long Short-Term Memory (LSTM), Gated Recurrent Unit (GRU), Decision Trees, Random Forests, Support Vector Machines (SVM), Neural Networks (NN), K-Nearest Neighbors (KNN), Gradient Boosting and Recurrent Neural Networks (RNN).

Thus, the system controller 34A uses the machine learning model 60 and machine learning techniques to predict an optimal location and orientation of the display 52 based on analyzing the real-time data of the location of the vehicle 10 and the operating conditions of the vehicle 10 in light of data received from the database 54 including past preferences for the optimal location and orientation of the display 52 and the locations and operating conditions of the vehicle 10 when such past preferences were recorded.

Anytime the system controller 34A receives real-time preferences from the occupant 56 related to a desired position and orientation of the display 52, the system controller 34A moves the display, via the motorized carriage 62, to the desired position, rotates and tilts the display 52, via the motorized articulating mount 72, to the desired orientation, and updates the machine learning model 60 of preferences of the occupant 56 for the position and orientation of the display 52.

In an exemplary embodiment, the system controller is further adapted to receive input from the occupant 56 selecting an application. The occupant 56 may provide such input via the display 52, wherein the display 52 is a touch screen display of an HMI, or the system controller 34A may receive such input from the occupant 56 from other systems within the vehicle 10, wherein the display 52 will be used to display information relevant to the selected application for the occupant 56. The system controller 34A accesses the machine learning model 60 of preferences of the occupant 56 based on past interactions when the occupant 56 used the selected application, automatically moves the display 52, via the motorized carriage 62, to an appropriate position for the occupant 56 to interact with the selected application, and automatically rotates and tilts the display 52, via the motorized articulating mount 72, to an appropriate orientation for the occupant 56 to interact with the selected application.

The appropriate position is either a first position (if the occupant 56 is reaching for the display 52) or a second position (if the occupant 56 is viewing the display 52) that is determined based on data from the database 54 and a prediction, by the machine learning model 60, of an optimal position for that occupant 56 using that application under the current operating and environmental conditions of the vehicle 10. The appropriate orientation is determined based on data from the database 54 and a prediction, by the machine learning model 60, of an optimal orientation for that occupant 56 using that application under the current operating and environmental conditions of the vehicle 10.

As mentioned above, anytime the system controller 34A receives real-time preferences from the occupant 56 related to a desired position and orientation of the display 52, the system controller 34A updates the machine learning model 60 of preferences of the occupant 56 for the position and orientation of the display 52. For example, as described above, the system controller 34A accesses the machine learning model 60 of preferences of the occupant 56 based on past interactions when the occupant 56 used the selected application and automatically moves the display 52 to an appropriate position for the occupant 56 to interact with the selected application and automatically rotates and tilts the display 52 to an appropriate orientation for the occupant 56 to interact with the selected application. The occupant 56 may provide real-time input to request that the position and/or orientation of the display 52 be further adjusted for personal preference, or due to environmental conditions, such as sun glare at that time of day. If additional real-time preferences are provided by the occupant 56, the system controller 34A will update the machine learning model 60 such that the machine learning model 60 will provide more accurate predictions of the optimal position and orientation of the display in the future.

In another exemplary embodiment, the system controller 34A is further adapted to determine that a specific application is required based on current vehicle conditions. This determination may be made by accessing the database 54 and the machine learning model 60 to identify past instances where the vehicle operating conditions, such as location, speed, weather, day/night, number of passengers, identity of passengers, etc. when the specific application was used by the occupant matches current operating conditions. The system controller 34A activates the specific application, accesses the machine learning model 60 of preferences of the occupant 56 for the location/position and orientation of the display 52 based on past interactions when the occupant 56 used the specific application, automatically moves the display 52, via the motorized carriage 62, to an appropriate position for the occupant 56 to interact with the specific application, and automatically rotates and tilts the display 52, via the motorized articulating mount 72, to an appropriate orientation for the occupant 56 to interact with the specific application.

In another exemplary embodiment, the system controller 34A is further adapted to receive, from the plurality of sensors 40a-40n within the vehicle 10 and the occupant monitoring system 50, data related to vehicle configuration (seat height, seat position, seat back angle, etc.), occupant features (height, seating position within the vehicle 10) and vehicle environmental conditions (weather, sunny, cloudy, speed, etc.), automatically adjust a location and orientation of the display 52 based on vehicle configuration, occupant features and vehicle environmental conditions, and update the machine learning model 60 in light of adjustments made to the location and orientation of the display 52 based on vehicle configuration, occupant features and vehicle environmental conditions. Thus, the system controller 34A "fine tunes" the location/position and orientation of the display 52 for the occupant 56 and the current conditions.

Referring to FIG. 6, a method 100 of automatically positioning a display 52 relative to an occupant 56 interacting with the display 52 within a vehicle 10 includes, beginning at block 102, wherein at least one occupant 56 rides within the vehicle 10, and moving to block 104, identifying, with a system controller 34A, user preferences for a position of the display 52 relative to the occupant 56 within the vehicle 10, moving to block 106, monitoring, with an occupant monitoring system 50 within the vehicle 10 and in communication with the system controller 34A, the occupant's 56 posture, hand position, hand movements, head movements and eye gaze, moving to block 108, receiving, with the system controller 34A, via a microphone 58 in communication with the system controller 34A, verbal input from the occupant 56, moving to block 110, determining, with the system controller 34A, based on data received from the occupant monitoring system 50 and the microphone 58, that the occupant 56 is either reaching toward the display 52, or viewing the display 52, and, moving from block 110 to block 112, when the system controller 34A determines that the occupant 56 is reaching toward the display 52, automatically moving the display 52 to a first position that is optimal for facilitating physical interaction, by the occupant 56, with the display 52, or, moving from block 110 to block 114, when the system controller 34A determines that the occupant 56 is viewing the display 52, automatically moving the display 52 to a second position that is optimal for allowing the occupant 56 to view the display 52.

Figure 7:
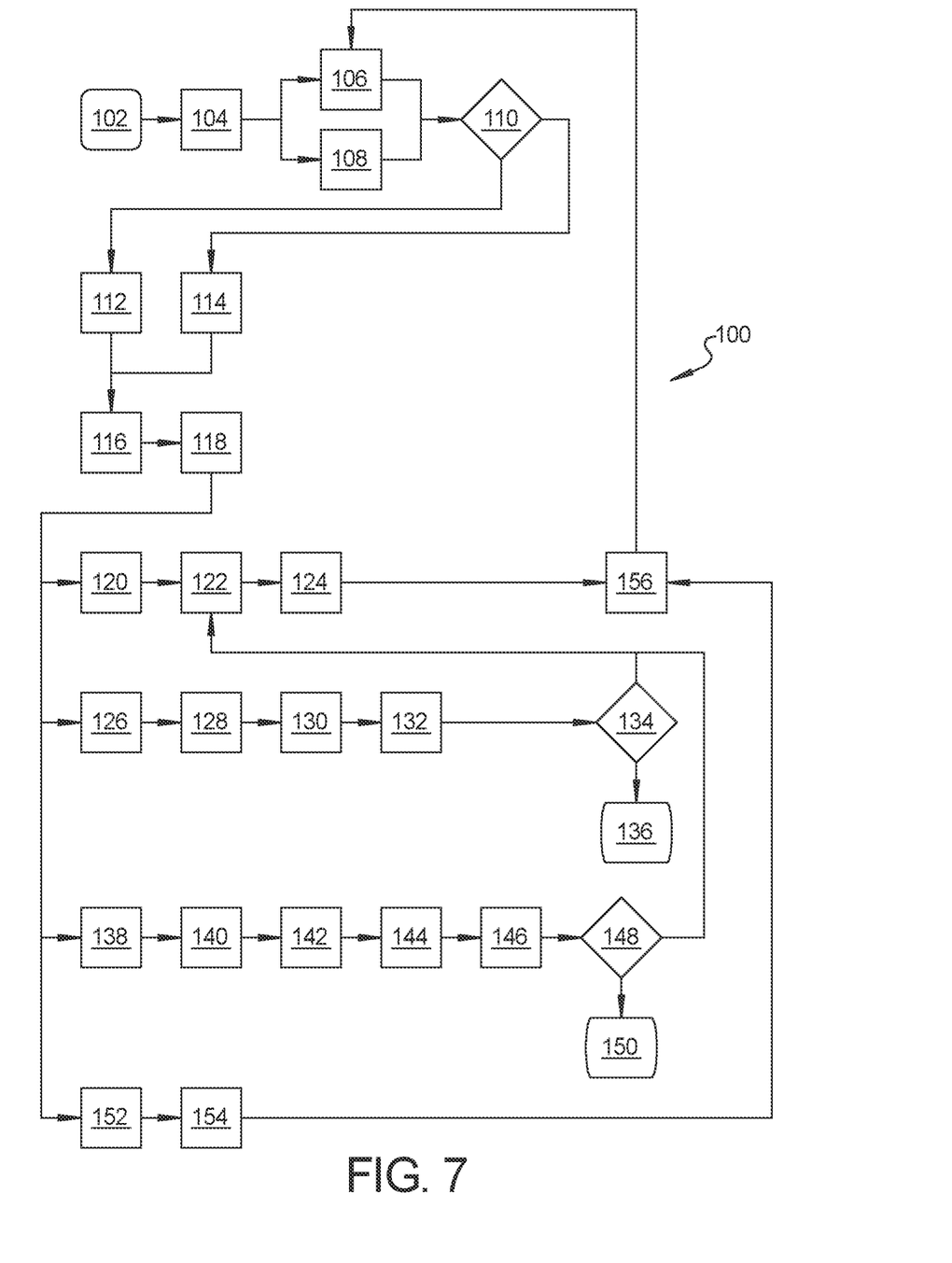
FIG. 7 is a flow chart illustrating a method of automatically positioning a display relative to an occupant interacting with the display within a vehicle according to an exemplary embodiment.

In an exemplary embodiment, the identifying, with a system controller, user preferences for a position of the display 52 relative to the occupant 56 within the vehicle 10 at block 104 further includes at least one of 1) receiving, with the system controller 34A, real time input from the occupant 56, and 2) accessing, with the system controller 34A, a machine learning model 60 of preferences of the occupant 56 based on past interactions.

In another exemplary embodiment, the method 100 further includes, moving from blocks 112 and 114 to block 116, identifying, with the system controller 34A, based on data received from the occupant monitoring system 50, a seating position of the occupant 56 within the vehicle 10, and, moving to block 118, automatically rotating and tilting the display 52 to an optimal orientation for interaction by the occupant 56.

In an exemplary embodiment, the automatically moving the display 52 to a first position that is optimal for facilitating physical interaction, by the occupant 56, with the display 52 at block 112 further includes automatically moving the display 52, via a motorized carriage 62 that is in communication with the system controller 34A and onto which the display 52 is mounted, along a track 64 within which the motorized carriage 62 is supported, to the first position that is optimal for facilitating physical interaction, by the occupant 56, with the display. The automatically moving the display 52 to a second position that is optimal for allowing the occupant 56 to view the display 52 at block 114 further includes automatically moving the display 52, via the motorized carriage 62, along the track 64, to the second position that is optimal for allowing the occupant 56 to view the display 52. The automatically rotating and tilting the display 52 to an optimal orientation for interaction by the occupant 56 at block 118 further includes automatically rotating and tilting the display 52, via a motorized articulating mount 72 that is in communication with the system controller 34A and supports the display 52 onto the motorized carriage 62, to an optimal orientation for interaction by the occupant 56.

In another exemplary embodiment, the automatically moving the display 52 to a first position that is optimal for facilitating physical interaction, by the occupant 56, with the display 52 at block 112 further includes automatically moving the display 52, via a mechanized articulating arm 92 that is in communication with the system controller 34A and onto which the display 52 is mounted, to the first position that is optimal for facilitating physical interaction, by the occupant 56, with the display. The automatically moving the display 52 to a second position that is optimal for allowing the occupant 56 to view the display 52 at block 114 further includes automatically moving the display 52, via the mechanized articulating arm 92, to the second position that is optimal for allowing the occupant 56 to view the display 52. The automatically rotating and tilting the display 52 to an optimal orientation for interaction by the occupant 56 at block 118 further includes automatically rotating and tilting the display 52, via the mechanized articulating arm 92, to an optimal orientation for interaction by the occupant 56.

In an exemplary embodiment, the automatically rotating and tilting the display 52 to an optimal orientation for interaction by the occupant 56 at block 118, further includes accessing, with the system controller, a machine learning model 60 of preferences of the occupant 56 based on past interactions.

In another exemplary embodiment, the method 100 further includes, moving from block 118 to block 120, receiving, with the system controller 34A, real-time preferences from the occupant 56 related to a desired position and orientation of the display 52, moving to block 122, moving, with the system controller 34A, the display 52 to the desired position, and, moving to block 124, rotating and tilting, with the system controller 34A, the display 52 to the desired orientation.

In another exemplary embodiment, the method 100 further includes, moving from block 118 to block 126, receiving, with the system controller 34A, input from the occupant 56 selecting an application, moving to block 128, accessing, with the system controller 34A, the machine learning model 60 of preferences of the occupant 56 based on past interactions when the occupant 56 used the selected application, moving to block 130, automatically moving, with the system controller 34A, the display 52 to an appropriate position for the occupant 56 to interact with the selected application, and moving to block 132, automatically rotating and tilting, with the system controller 34A, the display 52 to an appropriate orientation for the occupant 56 to interact with the selected application.

In an exemplary embodiment, the method 100 further includes, moving from block 132 to block 134, if the system controller 34A receives real-time preferences from the occupant 56 related to a desired position and orientation of the display 52 while using the selected application, then the method 100 includes, moving from block 134 to block 122, moving, with the system controller 34A, the display 52 to the desired position, and, moving to block 124, rotating and tilting, with the system controller 34A, the display 52 to the desired orientation. If the system controller 34A does not receive real-time preferences from the occupant 56, then, moving from block 134 to block 136, the system controller 34A makes no further adjustments to the position or orientation of the display 52.

In another exemplary embodiment, the method 100 includes, moving from block 118 to block 138, determining, with the system controller 34A, that a specific application is required based on current vehicle conditions, moving to block 140, activating, with the system controller 34A, the specific application, moving to block 142, accessing, with the system controller 34A, the machine learning model 60 of preferences of the occupant 56 based on past interactions when the occupant 56 used the specific application, moving to block 144, automatically moving, with the system controller 34A, the display 52 to an appropriate position for the occupant 56 to interact with the specific application, and, moving to block 146, automatically rotating and tilting, with the system controller 34A, the display 52 to an appropriate orientation for the occupant 56 to interact with the specific application.

In an exemplary embodiment, the method 100 further includes, moving from block 146 to block 148, if the system controller 34A receives real-time preferences from the occupant 56 related to a desired position and orientation of the display 52 while using the specific application, then the method 100 includes, moving from block 148 to block 122, moving, with the system controller 34A, the display 52 to the desired position, and, moving to block 124, rotating and tilting, with the system controller 34A, the display 52 to the desired orientation. If the system controller 34A does not receive real-time preferences from the occupant 56, then, moving from block 148 to block 150, the system controller 34A makes no further adjustments to the position or orientation of the display 52.

In another exemplary embodiment, the method 100 further includes, moving from block 118 to block 152, receiving, with the system controller 34A, data from a plurality of sensors 40a-40n within the vehicle 10 and the occupant monitoring system 50, and, moving to block 154, automatically adjusting a location and orientation of the display 52 based on vehicle configuration, occupant features and vehicle environmental conditions.

In an exemplary embodiment, the method 100 further includes, moving from block 154 to block 156, updating the machine learning model 60 in light of adjustments made to the location and orientation of the display 52 based on vehicle configuration, occupant features and vehicle environmental conditions.

In another exemplary embodiment, when the system controller receives real-time preferences for the position/location and orientation of the display at any one of blocks 120, 134 or 148, then, after moving, with the system controller 34A, via the motorized carriage 62, the display 52 along the track 64 onto which the display 52 is supported, to the desired position at block 122, and, rotating and tilting, with the system controller 34A, via the motorized articulating mount 72, the display 52 to the desired orientation at block 124, the method 100 further includes, moving from block 124 to block 156, updating, with the system controller 34A, the machine learning model 60 of preferences of the occupant 56.

A system and method of the present disclosure offers the advantage of automatically positioning a display relative to an occupant interacting with the display within a vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of automatically positioning a display relative to an occupant interacting with the display within a vehicle, comprising:
   identifying, with a system controller, user preferences for a position of the display relative to the occupant within the vehicle;
   monitoring, with an occupant monitoring system within the vehicle and in communication with the system controller, the occupant's posture, hand position, hand movements, head movements and eye gaze;
   receiving, with the system controller, via a microphone in communication with the system controller, verbal input from the occupant;
   determining, with the system controller, based on data received from the occupant monitoring system and the microphone, that the occupant is one of:
   reaching toward the display; or
   viewing the display;
   when the system controller determines that the occupant is reaching toward the display, automatically moving the display to a first position that is optimal for facilitating physical interaction, by the occupant, with the display; and
   when the system controller determines that the occupant is viewing the display, automatically moving the display to a second position that is optimal for allowing the occupant to view the display.

2. The method of claim 1, wherein the identifying, with a system controller, user preferences for a position of the display relative to the occupant within the vehicle further includes at least one of:
   receiving, with the system controller, real time input from the occupant; and
   accessing, with the system controller, a machine learning model of preferences of the occupant based on past interactions.

3. The method of claim 1, further including:
   identifying, with the system controller, based on data received from the occupant monitoring system, a seating position of the occupant within the vehicle; and automatically rotating and tilting the display to an optimal orientation for interaction by the occupant.

4. The method of claim 3, wherein the automatically rotating and tilting the display to an optimal orientation for interaction by the occupant further includes accessing, with the system controller, a machine learning model of preferences of the occupant based on past interactions.

5. The method of claim 4, wherein:
the automatically moving the display to a first position that is optimal for facilitating physical interaction, by the occupant, with the display further includes automatically moving the display, via a motorized carriage that is in communication with the system controller and onto which the display is mounted, along a track within which the motorized carriage is supported, to the first position that is optimal for facilitating physical interaction, by the occupant, with the display;
the automatically moving the display to a second position that is optimal for allowing the occupant to view the display further includes automatically moving the display, via the motorized carriage, along the track, to the second position that is optimal for allowing the occupant to view the display; and
the automatically rotating and tilting the display to an optimal orientation for interaction by the occupant further includes automatically rotating and tilting the display, via a motorized articulating mount that is in communication with the system controller and supports the display onto the motorized carriage, to an optimal orientation for interaction by the occupant.

6. The method of claim 4, wherein:
the automatically moving the display to a first position that is optimal for facilitating physical interaction, by the occupant, with the display further includes automatically moving the display, via a mechanized articulating arm that is in communication with the system controller and onto which the display is mounted, to the first position that is optimal for facilitating physical interaction, by the occupant, with the display;
the automatically moving the display to a second position that is optimal for allowing the occupant to view the display further includes automatically moving the display, via the mechanized articulating arm onto which the display is mounted, to the second position that is optimal for allowing the occupant to view the display; and
the automatically rotating and tilting the display to an optimal orientation for interaction by the occupant further includes automatically rotating and tilting the display, via the mechanized articulating arm onto which the display is mounted, to an optimal orientation for interaction by the occupant.

7. The method of claim 4, further including:
receiving, with the system controller, real-time preferences from the occupant related to a desired position and orientation of the display;
moving the display, with the system controller, to the desired position; and
rotating and tilting the display, with the system controller, to the desired orientation.

8. The method of claim 4, further including:
receiving, with the system controller, input from the occupant selecting an application;
accessing, with the system controller, the machine learning model of preferences of the occupant based on past interactions when the occupant used the selected application;
automatically moving the display, with the system controller, to an appropriate position for the occupant to interact with the selected application; and
automatically rotating and tilting the display, with the system controller, to an appropriate orientation for the occupant to interact with the selected application.

9. The method of claim 3, further including:
determining, with the system controller, that a specific application is required based on current vehicle conditions;
activating, with the system controller, the specific application;
accessing, with the system controller, the machine learning model of preferences of the occupant based on past interactions when the occupant used the specific application;
automatically moving the display, with the system controller, to an appropriate position for the occupant to interact with the specific application; and
automatically rotating and tilting the display, with the system controller, to an appropriate orientation for the occupant to interact with the specific application.

10. The method of claim 3, further including:
receiving, with the system controller, data from a plurality of sensors within the vehicle and the occupant monitoring system; and
automatically adjusting a location and orientation of the display based on vehicle configuration, occupant features and vehicle environmental conditions.

11. The method of claim 10, further including updating the machine learning model in light of adjustments made to the location and orientation of the display based on vehicle configuration, occupant features and vehicle environmental conditions.

12. The method of claim 3, further including updating, with the system controller, the machine learning model of preferences of the occupant when the system controller receives, from the occupant, real-time preferences for the position and orientation of the display.

13. A system for automatically positioning a display relative to an occupant interacting with the display within a vehicle, comprising:
a system controller adapted to identify user preferences for a position of the display relative to the occupant within the vehicle;
an occupant monitoring system in communication with the system controller and adapted to monitor the occupant's posture, hand position, hand movements, head movements and eye gaze;
a microphone in communication with the system controller and adapted to receive verbal input from the occupant;
the system controller further adapted to determine, based on data received from the occupant monitoring system and the microphone, that the occupant is one of:
reaching toward the display; or
viewing the display; and
automatically move the display to a first position that is optimal for facilitating physical interaction, by the occupant, with the display when the system controller determines that the occupant is reaching toward the display;
automatically move the display to a second position that is optimal for allowing the occupant to view the display when the system controller determines that the occupant is viewing the display;

identify, based on data received from the occupant monitoring system, a seating position of the occupant within the vehicle; and
automatically rotate and tilt the display to an optimal orientation for interaction by the occupant.

14. The system of claim 13, wherein the system controller is further adapted to:
automatically move the display, via a motorized carriage that is in communication with the system controller and onto which the display is mounted, along a track within which the motorized carriage is supported, to the first position that is optimal for facilitating physical interaction, by the occupant, with the display when the system controller determines that the occupant is reaching toward the display;
automatically move the display, via the motorized carriage, along the track, to the second position that is optimal for allowing the occupant to view the display when the system controller determines that the occupant is viewing the display; and
automatically rotate and tilt the display, via a motorized articulating mount that is in communication with the system controller and supports the display onto the motorized carriage, to the optimal orientation for interaction by the occupant.

15. The system of claim 13, wherein the system controller is further adapted to:
automatically move the display, via a mechanized articulating arm that is in communication with the system controller and onto which the display is mounted, to the first position that is optimal for facilitating physical interaction, by the occupant, with the display when the system controller determines that the occupant is reaching toward the display;
automatically move the display, via the mechanized articulating arm, to the second position that is optimal for allowing the occupant to view the display when the system controller determines that the occupant is viewing the display; and
automatically rotate and tilt the display, via the mechanized articulating arm, to the optimal orientation for interaction by the occupant.

16. The system of claim 13, wherein:
when identifying user preferences for a position of the display relative to the occupant within the vehicle and when rotating and tilting the display to an optimal orientation for interaction by the occupant the system controller is further adapted to at least one of:
receive real time input from the occupant; and
access a machine learning model of preferences of the occupant based on past interactions; and
when the system controller receives real-time preferences from the occupant related to a desired position and orientation of the display, the system controller is further adapted to:
move the display to the desired position;
rotate the display to the desired orientation; and
update the machine learning model of preferences of the occupant for the position and orientation of the display.

17. The system of claim 16, wherein the system controller is further adapted to:
receive input from the occupant selecting an application;
access the machine learning model of preferences of the occupant based on past interactions when the occupant used the selected application;
automatically move the display to an appropriate position for the occupant to interact with the selected application; and
automatically rotate and tilt the display to an appropriate orientation for the occupant to interact with the selected application.

18. The system of claim 16, wherein the system controller is further adapted to:
determine that a specific application is required based on current vehicle conditions;
activate the specific application;
access the machine learning model of preferences of the occupant based on past interactions when the occupant used the specific application;
automatically move the display to an appropriate position for the occupant to interact with the specific application; and
automatically rotate and tilt the display to an appropriate orientation for the occupant to interact with the specific application.

19. The system of claim 16, wherein the system controller is further adapted to:
receive, from a plurality of sensors within the vehicle and the occupant monitoring system, data related to vehicle configuration, occupant features and vehicle environmental conditions;
automatically adjust a location and orientation of the display based on vehicle configuration, occupant features and vehicle environmental conditions; and
update the machine learning model in light of adjustments made to the location and orientation of the display based on vehicle configuration, occupant features and vehicle environmental conditions.

20. A vehicle having a system for automatically positioning a display relative to an occupant interacting with the display within the vehicle, comprising:
a system controller adapted to identify user preferences for a position of the display relative to the occupant within the vehicle by at least one of: receiving real time input from the occupant, and accessing a machine learning model of preferences of the occupant based on past interactions;
an occupant monitoring system in communication with the system controller and adapted to monitor the occupant's posture, hand position, hand movements, head movements and eye gaze;
a microphone in communication with the system controller and adapted to receive verbal input from the occupant;
the system controller further adapted to determine, based on data received from the occupant monitoring system and the microphone, that the occupant is one of:
reaching toward the display; or
viewing the display; and
automatically move the display to a first position that is optimal for facilitating physical interaction, by the occupant, with the display when the system controller determines that the occupant is reaching toward the display;
automatically move the display to a second position that is optimal for allowing the occupant to view the display when the system controller determines that the occupant is viewing the display;
identify, based on data received from the occupant monitoring system, a seating position of the occupant within the vehicle; and automatically rotate and tilt the display to an optimal orientation for interaction by the occupant;

wherein:

when the system controller receives real-time preferences from the occupant related to a desired position and orientation of the display, the system controller is further adapted to:

move the display to the desired position;

rotate and tilt the display to the desired orientation; and update the machine learning model of preferences of the occupant for the position and orientation of the display;

when the system controller received input from the occupant selecting an application, the system controller is further adapted to:

access the machine learning model of preferences of the occupant based on past interactions when the occupant used the selected application;

automatically move the display to an appropriate position for the occupant to interact with the selected application; and automatically rotate and tilt the display to an appropriate orientation for the occupant to interact with the selected application; and when the system controller determines that a specific application is required based on current vehicle conditions, the system controller is further adapted to:

activate the specific application;

access the machine learning model of preferences of the occupant based on past interactions when the occupant used the specific application;

automatically move the display to an appropriate position for the occupant to interact with the specific application; and automatically rotate and tilt the display to an appropriate orientation for the occupant to interact with the specific application.

\* \* \* \* \*